United States Patent [19]
Peiffer et al.

[11] Patent Number: 5,212,009
[45] Date of Patent: May 18, 1993

[54] MULTI-LAYER TRANSPARENT POLYOLEFIN FILM FOR APPLICATION IN SHRINK LABELLING

[75] Inventors: Herbert Peiffer, Mainz; Gunter Schloegi, Kelkheim; Lothar Bothe, Mainz-Gonsenheim, all of Fed. Rep. of Germany

[73] Assignee: Hoechst Aktiengesellschaft, Frankfurt am Main, Fed. Rep. of Germany

[21] Appl. No.: 525,600

[22] Filed: May 21, 1990

[30] Foreign Application Priority Data

May 31, 1989 [DE] Fed. Rep. of Germany ....... 3917652

[51] Int. Cl.$^5$ .............................................. B32B 27/32
[52] U.S. Cl. .................................... 428/220; 428/327; 428/330; 428/331; 428/323; 428/336; 428/516; 525/240
[58] Field of Search ................ 525/240; 428/516, 336, 428/220

[56] References Cited

U.S. PATENT DOCUMENTS

| | | | |
|---|---|---|---|
| 4,230,767 | 10/1980 | Isaka et al. | 428/516 |
| 4,352,849 | 10/1982 | Mueller | 428/213 |
| 4,390,385 | 6/1983 | Ferguson et al. | 428/516 |
| 4,410,582 | 10/1983 | Tsunashima et al. | |
| 4,649,009 | 3/1987 | Shibata et al. | 264/235.8 |
| 4,652,489 | 3/1987 | Cross et al. | 428/516 |
| 4,766,178 | 8/1988 | Hwo | 525/240 |
| 4,769,421 | 9/1988 | Hwo | 525/240 |
| 4,927,885 | 5/1990 | Hayashida et al. | 525/211 |

FOREIGN PATENT DOCUMENTS 0340579 11/1988 European Pat. Off. .
2055688A 3/1981 United Kingdom .

OTHER PUBLICATIONS

World Patents Index Latest No. 82-78064E(37) Derwent Publications Ltd. London GB & JP-A-57128548 (Toyobo KK) Oct. 8, 1982.
World Patents Index Latest No. 82-49171E(24) Derwent Publications Ltd., London GB & JP-A-57074152 (Toyobo KK) Oct. 5, 1982.
World Patents Index Latest No. 85-258884 (42) Derwent Publication Ltd., London GB & JP-A-60171150 (Oji Yuka Goseishi KK) Apr. 9, 1985.
World Patents Index Lastest No. 89-058574 (08) Derwent Publications Ltd., London GB & JP-A-1011828 (Showa Denko KK) Jan. 17, 1989.
Chemical Abstracts, vol. 78, No. 6, 12 Feb. 1973, Columbus Ohio, U.S.A. Seite 38; ref. No. 30781H & JP-A-47030093.
Dr. H. Roder, "Neue Wege im Design: Schrumpfetiketierung-Technik und Anwendung," Verpackungsrundschau, Oct., 1983, pp. 1121-1122.
Japanese Abstract: A97, 87-147803/21, J62086-388-A.

Primary Examiner—Carman J. Seccuro, Jr.
Attorney, Agent, or Firm—Foley & Lardner

[57] ABSTRACT

Described is a transparent shrinkable film comprising a base layer prepared from propylene-containing polymers and a hydrocarbon resin. The base layer contains about 5% to 40% by weight of a propylene homopolymer, 0% to about 30% by weight of a hydrogenated hydrocarbon resin having a softening point in the range from about 80° to 125° C., and about 30% to 95% by weight of a random ethylene-propylene copolymer, the percentages being related to the total weight of the mixture. A top layer is arranged on either side of the base layer. The invention also describes a process for the manufacture of the film.

22 Claims, No Drawings

MULTI-LAYER TRANSPARENT POLYOLEFIN FILM FOR APPLICATION IN SHRINK LABELLING

BACKGROUND OF THE INVENTION

The invention relates to a transparent shrinkable film comprising a base layer prepared from propylene-containing polymers and a hydrocarbon resin. The invention also relates to a process for the manufacture of a film of this type and its use as shrink labels.

From "Verpackungsrundschau" ("Packaging Review"), No. 10/1983, pp. 1121-1122, it is already known to surround cylindrical or generally cylindrical packaging units, such as bottles or cans, with overall labels covering their entire circumference; these overall labels are termed 'sleeves' in the English-language literature. The films used for this purpose are, for example, made of polyethylene, polybutylene, polystyrene, polyethylene-polypropylene copolymers, ethylenevinyl acetate copolymers and various blends, but in particular of polyvinyl chloride. To obtain shrink properties of the films in the circumferential direction of the overall labels, which are appropriate for the intended purpose, the films are in general biaxially stretch-oriented, for example, according to the bubble, stentar or calender process, particular attention being paid to orientation in the transverse direction. In order to ensure an absolutely crease-free, close contact between the overall label and the packaging unit, the shrink values required are, for example: transverse shrink ($s_t$) about 15% to 40% and longitudinal shrink ($s_l$) not more than 2% to 5%, at a temperature of 90° C. and a treating time of 15 minutes in a circulating air oven.

Moreover, the shrink films are provided with a printing, for example by the reverse printing process, and are subsequently glued or welded to form a tubing. Due to the controlled transverse shrink, the tubing shrinks tightly and crease-free around the packaging unit in the shrink tunnel. The label is applied automatically with the aid of brushes or optionally also by hand. In addition to the desired shrink, the overall labels must possess the following properties: high gloss, optical clarity, good slip and rigidity (=product of modulus of elasticity and thickness[3]) for the automatic application of the label, good printability and good weldability/bondability.

For an economical fabrication of overall labels it is also advantageous to have heat-sealable films. Compared with gluing or welding, less time is required for sealing and, in addition, it is possible to save material.

As indicated in U.S. Pat. No. 4,352,849, all requirements outlined above are, according to the state of the art, best attained by PVC film. It is in particular due to the high shrinkability and the good optical and mechanical properties of these films that almost the complete application range is covered. The variation in shape or diameter of the packaging unit, in particular of the can or bottle, can amount to more than 30% in the area of the label.

Disadvantages of overall labels made of PVC include high price, which mainly results from the high density of PVC of 1.39 kg/dm[3], which is about 50% higher than the density of, for example, polypropylene. Furthermore, there are problems with regard to corrosion of the manufacturing and processing equipment (see EP-A No. 0 233 400). Polyolefin-based films for shrink labels are predominantly formed of blends comprising homo-, co- and terpolymers. To achieve the required shrink properties, the films are biaxially stretched in a bubble or stenter process.

As is known from the prior art, shrink labels based on polyolefin films have properties which may prove disadvantageous during processing for practical use. In most cases, their mechanical properties, such as tear resistance, modulus of elasticity and transverse thickness profile, are poor. The process for accomplishing high transverse shrinkage and low longitudinal shrinkage furthermore is very expensive. Moreover, the films are non-sealable.

Insufficient mechanical properties are a particular disadvantage when automatically operating shrinkage equipment is used. To obtain an adequate rigidity, comparable to that of PVC (corresponding or similarly good), the thickness of polyolefinic film must, in some cases, be increased by up to 50% or even more. As a result of this, the price of the film rises correspondingly and, moreover, the shrink rate (to attain an identical final shrink value) is slowed down by the increased film thickness.

A prior art process for achieving a high ratio of transverse shrinkage to longitudinal shrinkage in polypropylene films is, for example, described in detail in EP-A No. 0 171 733. This publication also discloses films forming the class of films comprising propylene-containing polymers and a resin addition. In the process described in this publication, a biaxially oriented film is produced in a two-stage process. To achieve a low longitudinal shrinkage the film is subjected to an additional tempering treatment at elevated temperature (about 130° C.) between the longitudinal stretching and the transverse stretching. The tempering time ranges between 2 and 180 seconds. Depending on the operating speed of the production line (nowadays usually about 200 to 300 m/min) the process requires the installation of a relatively expensive and complicated aggregate between the sections for longitudinal and transverse stretching, since at a tempering time of, for example, 60 seconds and a machine speed of 200 m/min, the oven would have to be 200 m long. From the point of view of process technology, the method is therefore hardly suitable for film production according to modern processes. Moreover, the mechanical properties of the film need improving and it is, in particular, the uniformity of thickness measured over the film width which is unsatisfactory due to the very low transverse stretching ratio of about 4. Uniform winding into reels and a satisfactory printing image cannot be obtained.

It is also known that, in addition to PVC, blends based on olefinic homo-, co- and terpolymers are especially used for application as overall labels. Thus JP-A No. 224 868 (Toray) describes a heat-shrinkable multi-layer film based on polypropylene, which has an AB or ABA layer arrangement. Layer A comprises a random ethylene-propylene copolymer and layer B a blend of a random ethylene-propylene copolymer and a propylene-butylene copolymer. As is specified, the shrinkage of the film in the circumferential direction of the finished sleeve is $s_t \geq 15\%$ at 100° C. This film, however, has the disadvantage that the values of its mechanical properties are strikingly low. While in the case of PVC, the values of the modulus of elasticity are about 2,600 to 2,900 N/mm[2] in the longitudinal direction ($E_l$) and about 3,500 to 3,800 N/mm[2] in the transverse direction ($E_t$), the corresponding values of the above-described polyolefinic film are $E_l$ about 100 to 600 N/mm[2] and $E_t$ about 100 to 1,500 N/mm². To achieve an identical or similarly good rigidity as in PVC, the thickness of the polyolefinic film must be increased by about 50%. This has, however, the consequence that the price of the film rises correspondingly.

SUMMARY OF THE INVENTION

Accordingly, it is an object of the present invention to provide a transparent multi-layer film based on polypropylene, for use in overall labels, which has good bonding and shrinking characteristics, good optical and mechanical properties, and is sealable.

Another object of the present invention is to provide a film which is useful in high-speed manufacturing processes (rate≧100 m/minute) and is more economical than films according to the state of the art.

A further object of the present invention is to provide a process for producing the foregoing film.

In accomplishing the foregoing objectives, there has been provided, in accordance with one aspect of the present invention, a transparent shrinkable film comprising a base layer comprising about 5 to 40 wt% of a propylene homopolymer, 0 to about 30 wt% of a hydrogenated hydrocarbon resin having a softening point in the range from about 80° to 125° C., and about 30 to 95 wt% of a random ethylene-propylene copolymer, wherein all percentages are related to the total weight of the mixture, and a top layer on either side of the base layer.

In accordance with another aspect of the present invention there is provided a process for producing the foregoing film which comprises the steps of producing a cast film by coextrusion through a slot die, solidifying the cast film on a chill roll and orienting the film by stretching in the longitudinal and transverse directions, wherein longitudinal stretching is carried out at a temperature above 115° C. and at a stretching ratio of less than 3, and wherein transverse stretching is carried out at a temperature below 120° C. at a stretching ratio of more than 8.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

The film according to the invention is characterized in that a base layer contains about 5 to 40% by weight of a propylene homopolymer, preferably 5 to 17 % by weight, 0 to about 0% by weight of a hydrogenated hydrocarbon resin having a softening point in the range from 80° to 25° C., preferably 3 to 15 % by weight, and about 30 to 95% by weight of a random ethylene-propylene copolymer, preferably 65 to 92 % by weight, the percentages being related to the total weight of the mixture, and in that a top layer is provided on either side of the base layer.

The propylene homopolymer of the base layer is an isotactic polypropylene having an n-heptane-soluble fraction of about 15% by weight or less. Isotactic polypropylenes with an n-heptane-soluble fraction of 2 to 6% by weight are particularly preferred. Suitable propylene homopolymers expediently have a melt flow index of about 0.5 g/10 min to 8 g/10 min, in particular of 1.5 g/10 min to 4 g/10 min, at 230° C. and under a load of 21.18 N (determined in accordance with DIN 53 735).

The hydrocarbon resin which, in accordance with this invention, is contained in the base layer of the film, is a low-molecular weight synthetic resin which has a softening point, determined according to ASTM-E 28, in the preferred range from about 90° C. to 120° C. Hydrocarbon resins of this type are usually prepared from resin-forming compounds, such as styrene, methyl styrene, vinyl toluene, indene, pentadiene, cyclopentadiene and the like. In accordance with this invention, preference is given to hydrogenated resins, in particular to hydrogenated cyclopentadiene resins. Their color number according to Saybolt (acc. to ASTM-D 158) is greater than about 20, preferably greater than 25.

The random ethylene-prop),lene copolymer preferably has a melting point in the range from about 125° to 145° C. and an enthalpy of fusion of about 60 to 90 J/g. The amount of ethylene is about 4.0 to 7.0% by weight, based on the total weight of the polymer.

The top layers of the shrink film according to the invention are made of alpha-olefinic polymers. Suitable alpha-olefin polymers comprise ethylene homopolymers, copolymers of ethylene and propylene, ethylene or propylene and butylene, or another alpha-olefin having 5 to about 10 carbon atoms, terpolymers of ethylene, propylene and butylene or another alpha-olefin having 5 to about 10 carbon atoms, or mixtures of these polymers. Ethylene-propylene copolymers, ethylene-butylene copolymers, propylene-butylene copolymers, ethylene-propylene-butylene terpolymers or mixtures of these polymers are preferably employed. Particularly preferred olefin polymers for use in the top layers are ethylene-propylene copolymers having propylene as the main component and containing about 2 to 10% by weight of ethylene (based on the weight of the copolymer), propylene-butylene copolymers having propylene as the main component and containing about 0.5 to 25% by weight of butylene (based on the copolymer), and ethylene-propylene-butylene terpolymers having propylene as the main component and containing about 0.5 to 7% by weight of ethylene and about 5 to 30% by weight of butylene (percentages by weight based on the terpolymer), and mixtures of these polymers. The co- and terpolymers concerned are random polymers.

The olefin polymer of the top layers has a lower melting point than the polymer/resin mixture of the base layer. The melt flow index of the olefin polymer or of the mixture of olefin polymers is higher than that of the propylene polymer of the base layer. The olefin polymer or mixture thereof used for the top layers has a melt flow index which is, in general, in the range from about 1 to 12 g/10 minutes, preferably from 3 to 9 g/10 minutes, at 230° C. and under a load of 21.18 N (DIN 53 735).

To even further improve certain properties of the shrink film according to the invention, in particular the running properties of the film during manufacturing or processing, the layers may contain effective amounts each of suitable additives, preferably antistatic agents, anti-blocking agents and/or lubricants.

Preferred antistatic agents include essentially straight-chain, saturated aliphatic tertiary amines with aliphatic radicals having about to 20 carbon atoms and being substituted by 2-hydroxyalkyl-($C_1$ to $C_4$) groups. Preferred amines are N,N-bis-(2-hydroxyethyl)-alkylamines having about 10 to 20, preferably 12 to 18, carbon atoms in their alkyl groups. The effective amount of antistatic agent varies in the range from about 0.05 to 1% by weight, based on the weight of the layer.

It has been found particularly advantageous to add to the base layer about (0.1 to 0.7 % by weight of an N,N-bis-ethoxy-alkylamine with an aliphatic radical having 10 to 20 carbon atoms.

According to another preferred embodiment at least one top layer contains about 0.1 to 0.8% by weight, preferably 0.15 to 0.3% by weight, of an anti-blocking agent having an average particle size of about 0.5 to 3 μm, preferably 1 to 2 μm.

Anti-blocking agents which may be used comprise inorganic additives such as silicon dioxide, calcium carbonate, magnesium silicate, aluminum silicate, calcium phosphate and the like and/or incompatible organic polymers such as polyamides, polyesters, polycarbonates and the like. Silicon dioxide or calcium carbonate are preferably employed as the anti-blocking agents.

Examples of lubricants are higher aliphatic acid amides, higher aliphatic acid esters, waxes and metallic soaps and also polydimethylsiloxane. The effective amount of lubricant added is in the range from about 0.1 to 2% by weight, based on the weight of the layer. An addition of 0.15 to 0.25% by weight of a higher aliphatic acid amide (e.g., erucic acid amide) to the base layer and/or to the top layers has proved to be particularly advantageous. Excellent results are achieved when polydimethylsiloxane is added to one or both top layers. The added amount expediently varies between about 0.5 to 1.5% by weight, and the polydimethylsiloxane employed has a viscosity of between about 1,000 and 500,000 $mm^2/s$.

The film according to this invention has a thickness in the range from about 20 to 60 μm, preferably from 30 to 50 μm, the top layers having a thickness of about 0.5 to 1.5 μm each.

The film according to the present invention, which in respect of its chemical composition has been described above, is in particular characterized by highly desirable shrink properties. The capacity of the film for shrinking in the transverse direction is higher than 15% at 90° C. and higher than 40% at 120° C. and, at the same time, the capacity for shrinking in the longitudinal direction is less than 5% at 90° C. and less than 10% at 120° C., the percentages being in each case related to the respective linear dimension of the film prior to the shrinking process. The shrink values specified were in each case determined in a circulating air oven during 15 minutes, in accordance with DIN 406 34. The film according to the invention preferably has a capacity for shrinking which varies from about 15 to 25% at 90° C. and from about 40 to 60% at 120° C. in the transverse direction and from not more than about 3 to 4% at 90° C. and not more than about 7 to 10% at 120° C. in the longitudinal direction, each time based on the linear dimension of the film prior to the shrinking process.

Apart from the above-described excellent shrink properties, the film according to this invention also possesses highly desirable mechanical properties. The modulus of elasticity is determined by means of a type 1445 tensile strength tester from Messrs. Zwick, Ulm, West Germany, in accordance with DIN 53 455. Employing this method, the moduli of elasticity determined for the film of this invention are more than 1,200 $N/mm^2$, preferably about 1,300 to 1,800 $N/mm^2$, in the longitudinal direction and more than 3,000 $N/mm^2$, preferably about 3,500 N/mm, to 4,500 $N/mm^2$, in the transverse direction.

Another physical parameter used to express the mechanical properties of the film of this invention is the tear resistance, which is also determined according to DIN 53 455. The shrink film of this invention shows a tear resistance of more than 50 $N/mm^2$, preferably in the range from about 70 to 100 $N/mm^2$, in the longitudinal direction, and of more than 220 $N/mm^2$, preferably in the range from about 235 to 290 $N/mm^2$, in the transverse direction.

In particular the optical properties of the film of this invention are excellent. The gloss value is in the range from about 110 to 130, as determined in accordance with DIN 67 530 or ASTM-D 23 (20 value) and the haze of the film is less than 20%, in particular about 10 to 15%, as measured following the method of ASTM-D 1003-52. In lieu of a 4° round aperture diaphragm, a 1° slot aperture diaphragm is used, and the haze, in percent, is determined for four superimposed film layers. The four layers were selected to exploit the optimum measuring range. Due to its very high gloss, the film according to this invention has, in particular, a high advertising value and is therefore employed with particular advantage for applications where the labelling (slipping over and shrinkage) is performed automatically and where the optical appearance of the product (can/bottle/dispenser) is of great importance.

The object of this invention as defined at the outset is also achieved by a process for the manufacture of the above-described film. The process of this invention comprises first producing a cast film by extrusion or coextrusion through a slot die, solidifying the cast film on a chill roll and subsequently orienting the film by stretching in the longitudinal and transverse directions. In accordance with this invention, the conditions for the longitudinal stretching are selected such that the longitudinally stretched film exhibits only a low degree of orientation. These are very favorable preconditions for achieving a high shrink in the transverse direction and a low shrink in the longitudinal direction. A customary measure for evaluating the degree of orientation of the film stretched in the longitudinal direction is the birefringence index $\Delta n$. The film according to this invention is characterized in that after stretching in the longitudinal direction, but before stretching in the transverse direction, its birefringence index $\Delta n$ does not exceed $6 \cdot 10^{-3}$. Preferably, the birefringence index $\Delta n$ should be inferior to $4 \cdot 10^{-3}$. Stretching in the longitudinal direction is carried out at a temperature above 115° C., preferably in the range from about 120° to 130° C., and at a stretching ratio of less than 3, preferably in the range from about 1.5 to 2.5. Even a stretching ratio as low as that surprisingly yields a good thickness profile in the machine direction when the above-indicated raw material composition is used. The variations in thickness are less than about 7 to 9%.

It has unexpectedly been found that under these conditions and using the above-specified polymer mixture, the temperature of transverse stretching $T_t$ can be chosen to be considerably lower than the temperature customarily employed while, at the same time, an excellent safety of process (which signifies less breaking of the film in the transverse tenter) is ensured, which is also maintained at a higher production rate ($\geq 100$ m/minute). According to the invention, stretching in the transverse direction is carried out at a temperature below 120° C., preferably below 110° C. The stretching ratio in the transverse direction is, according to the invention, higher than 8, preferably in the range from about 9 to 12. As a result of the high transverse stretching ratio, a very uniform thickness profile is obtained. Variations in profile are clearly below 8%.

Stretching of the film in the transverse direction is followed by a final setting step. During this step, the film is, optionally slightly convergently, conveyed forward in the tenter, while the temperature is kept about 20° to 40° C. below the stretching temperature, in particular below 110° C., and most preferably below 80° C. The tenter convergence during the setting step preferably is about 5 to 15%.

It should be pointed out that the manufacturing process of this invention makes it possible to incorporate low-molecular weight additives (carboxylic acid amides, N,N-bis-ethoxyalkylamines) into the top layers without significant technical difficulties. Problems in respect of material exudation and deposition in the transverse tenter are not encountered. Due to the process conditions of this invention, any disturbing blooming of resins is avoided.

Printability and good bonding properties of the film are achieved by subjecting the film to any of the customary surface treatments, for example, a flame treatment or an electrical corona treatment, prior to winding up.

Any of the customary methods can be employed for the corona treatment which is expediently performed in such a way that the film is passed between two conductive elements serving as electrodes, while a high voltage, in general an alternating voltage (about 10,000 V and 10,000 Hz) which is sufficient to initiate spray or corona discharges, is applied to the electrodes. By these spray or corona discharges the air above the film surface is ionized and combines with the molecules present on the film surface, so that polar inclusions are formed in the essentially unpolar polymer matrix.

The treatment intensities are within the customary limits. Preference is given to intensities between about 38 and 42 mN/m.

Prints on the film are usually produced by reverse side printing.

The shrink film manufactured in this way possesses a combination of properties which render it highly suitable for its intended use as a film for overall labels. A particularly preferred field of application is the labelling of those cans or bottles, where the dimensional variations in the areas to be surrounded by the labels are below 25%.

The film according to this invention, which has been described in detail above, will be further explained by means of an illustrative example which follows.

EXAMPLE

| | A-Base Layer: |
|---|---|
| 10 % by weight | of an isotactic polypropylene, |
| 8 % by weight | of a hydrogenated cyclopentadiene resin having a softening temperature of 120° C., |
| 81.6 % by weight | of a random ethylene-propylene copolymer containing 4.5% by weight of ethylene ($T_M = 136°$ C., $\Delta h_M = 70$ J/g), |
| 0.2 % by weight | of N,N-bis-ethoxy-hexadecylamine and |
| 0.2 % by weight | of erucic acid amide. |

| B-Top Layer: |
|---|
| 1:1 moisture comprising |
| 1.) random ethylene-propylene-butene-1 terpolymers having a $C_2$-content of 1.4% by weight, a $C_3$-content of 95.8% by weight and a $C_4$-content of 2.8% by weight and |
| 2.) a random propylene-butene-1 copolymer having a $C_4$-content of 66.8% by weight. |

The melt index of the mixture at 230° C. and under a load of 21.18 N is 8 g/10 minutes. The anti-blocking agent added to the raw material of the top layers was formed of 0.2% by weight of calcium carbonate having an average particle size of 2 μm.

This film having a BAB layer arrangement is manufactured in the following process steps: coextrusion, cooling, longitudinal stretching, transverse stretching, setting. The total film thickness is 40 μm, the top layers are 0.7 μm thick. The manufacturing conditions in the individual process steps are as follows:

Extrusion:
Temperature of the melts                240° C.
Temperature of the draw off roll        30° C.
Longitudinal Stretching:
Temperature $T = 122°$ C.
Longitudinal stretching ratio $\lambda = 1.8$
Transverse Stretching:
Temperature $T = 110°$ C.
Longitudinal stretching ratio $\lambda = 10$
Setting:
Temperature $T = 80°$ C.
Time $t = 1$ second The film manufactured in this manner has the properties listed in the Table below (last line). The film was subjected to a corona printability and good bonding properties. The intensity of treatment was 39 mN/m.

In the Table, the film according to the present invention is compared with a PVC film, films according to two Japanese publications mentioned and a polypropylene film manufactured under conditions similar to those used for the film of the invention, but without resin addition and without top layers. A comparison of the indicated properties shows that the film according to the present invention is superior to all films of the prior art, in particular in view of the combination of properties envisaged for the intended application.

| Film | Properties | Shrink (%) 15 minutes in air transv./long. | | Modulus of Elasticity N/mm² long./transv. | | Tear Resistance N/mm² long./transv. | | Haze (%) | Gloss | Density (kg/m³) |
|---|---|---|---|---|---|---|---|---|---|---|
| | | 90° C. | 120 | | | | | | | |
| PVC | | 50/6 | 52/6 | 2700 | 3700 | 60 | 110 | 20 | 120 | 1390 |
| JP 91 354 | | 20/3 | 58/7 | <1000 | ~1000 | <50 | ~100 | ~30 | ~100 | ~900 |
| JP 224 868 | | | | <1000 | ~1000 | <50 | ~100 | ~30 | ~100 | ~900 |

-continued

| Film | Properties | Shrink (%) 15 minutes in air transv./long. 90° C. | 120 | Modulus of Elasticity N/mm² long./transv. | | Tear Resistance N/mm² long./transv. | | Haze (%) | Gloss | Density (kg/m³) |
|---|---|---|---|---|---|---|---|---|---|---|
| Polypropylene | | 10/6 | 20/9 | 2200 | 4500 | 130 | 300 | 30 | 105 | 900 |
| EP-A-171 733 | | 100° C., 38/10 | 5 min | ~1500 | ~1500 | 120 | 100 | 30 | 100 | 900 |
| Film according to the invention | | 18/3 | 45/9 | 1200 | 4500 | | 250 | 11 | 130 | 900 |

What is claimed is:

1. A transparent shrinkable film comprising
   (i) a base layer comprising:
      (a) about 5 to 40 wt % of a propylene homopolymer,
      (b) 0 to about 30 wt % of a hydrogenated hydrocarbon resin having a softening point in the range from about 80° to 125° C., and
      (c) about 30 to 95 wt % of a random ethylene-propylene copolymer,
      wherein all percentages are related to the total weight of the mixture, and
   (ii) a top layer having a melting point lower than the base layer comprising at least one α-olefin polymer on each side of said base layer,
   wherein said film has (2) a capacity for shrinking of more than 15% at 90° C. and of more than 40% at 120° C., in the transverse direction and, at the same time, a capacity for shrinking of less than 5% at 90° C. and of less than 10% at 120° C., in the longitudinal direction, the percentages being in each case related to the respective linear dimension of the film prior to the shrinking process (2) a modulus of elasticity in the longitudinal direction of more than 1,200 N/mm², and a modulus of elasticity in the transverse direction of more than 3,000 N/mm² and (3) a tear resistance of more than 50 N/mm², in the longitudinal direction and of more than 220 N/mm² in the transverse direction.

2. A film as claimed in claim 1, wherein said base layer comprises 5 to 17 wt % of propylene homopolymer (a).

3. A film as claimed in claim 1, wherein said base layer comprises 3 to 15 wt % of hydrogenated hydrocarbon resin (b).

4. A film as claimed in claim 1, wherein said base layer comprises 65 to 92 wt % of random ethylene-propylene copolymer (c).

5. A film as claimed in claim 1, wherein random copolymer (c) has an enthalpy of fusion of about 60 to 90 J/g.

6. A film as claimed in claim 1, wherein random ethylene-propylene copolymer (c) has a melting point of about 125° to 145° C.

7. A film as claimed in claim 1, wherein said top layers comprise a polymer selected from the group consisting of an ethylene homopolymer, an ethylene-propylene copolymer, a copolymer of ethylene or propylene and butylene or another α-olefin having 5 to about 10 carbon atoms, and a terpolymer of ethylene, propylene and butylene or another α-olefin having 5 to about 10 carbon atoms, or a mixture of said polymers.

8. A film as claimed in claim 7, wherein said top layers comprise a polymer selected from the group consisting of an ethylene-propylene copolymer containing about 2 to 10 wt % of ethylene based on the copolymer, a propylene-butylene copolymer containing about 0.5 to 25 wt % of butylene based on the copolymer, and an ethylene-propylene-butylene based on the copolymer, and an ethylene-propylene-butylene terpolymer containing about 0.5 to 7 wt % of ethylene and about 5 to 30 wt % of butylene based on the total weight of the terpolymer, or a mixture of said polymers.

9. A film as claimed in claim 1, consisting essentially of the recited ingredients.

10. A film as claimed in claim 1, wherein the olefin polymer or olefin polymer mixture of the top layers has a melting point which is lower than the melting point of the polymer/resin mixture of the base layer and wherein the melt flow index of the olefin polymer or olefin polymer mixture is higher than that of the propylene polymer of the base layer.

11. A film as claimed in claim 10, wherein the melt flow index of the olefin polymer or olefin polymer mixture of the top layers is about 1 to 12 g/10 minutes at 230° C. and under a load of 21.18 N.

12. A film as claimed in claim 11, wherein said melt flow index is 3 to 9 g/10 minutes.

13. A film as claimed in claim 1, wherein said top layers further comprise antistatic agents in an effective amount varying in the range from about 0.05 to 1% by weight, based on the weight of the top layers.

14. A film as claimed in claim 1, wherein said top layers further comprise about 0.1 to 0.8% by weight, of an anti-blocking agent having an average particle size of about 0.5 to 3 μm.

15. A film as claimed in claim 14, wherein said anti-blocking agent is present in an amount of 0.15 to 0.3 wt %.

16. A film as claimed in claim 14, wherein said average particle size is 1 to 2 μm.

17. A film as claimed in claim 1, wherein the film has a thickness in the range from about 20 to 60 μm, and wherein the top layers have a thickness of about 0.5 to 1.5 μm each.

18. A film as claimed in claim 17, wherein said film has a thickness of 30 to 50 μm.

19. A film as claimed in claim 1, which has a modulus of elasticity in the longitudinal direction of about 1,300 to 1,800 N/mm².

20. A film as claimed in claim 1, which has a modulus of elasticity in the transverse direction of about 3,500 to 4,500 N/mm².

21. A film as claimed in claim 1, which has a tear resistance in the longitudinal direction of about 70 to 100 N/mm².

22. A film as claimed in claim 1, which has a tear resistance in the transverse direction of about 235 to 290 N/mm².

* * * * *

UNITED STATES PATENT AND TRADEMARK OFFICE
CERTIFICATE OF CORRECTION

PATENT NO. : 5,212,009
DATED : May 18, 1993
INVENTOR(S) : Herbert PEIFFER, Gunter SCHLOEGI and Lothar BOTHE It is certified that error appears in the above-indentified patent and that said Letters Patent is hereby corrected as shown below:

Claim 8, Column 10, lines 16 and 17, delete "ethylene-propylene-butylene based on the copolymer, and an".

Signed and Sealed this

Second Day of August, 1994

Attest:

BRUCE LEHMAN

*Attesting Officer*  *Commissioner of Patents and Trademarks*